US007009726B2

(12) United States Patent
Lumley

(10) Patent No.: US 7,009,726 B2
(45) Date of Patent: Mar. 7, 2006

(54) METHOD AND APPARATUS FOR SELECTION OF ITEMS

(75) Inventor: John William Lumley, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 867 days.

(21) Appl. No.: 09/859,416

(22) Filed: May 18, 2001

(65) Prior Publication Data

US 2001/0052993 A1  Dec. 20, 2001

(30) Foreign Application Priority Data

May 24, 2000   (EP)  ............................... 00304417

(51) Int. Cl.
*G06F 15/00* (2006.01)
*G06K 1/00* (2006.01)
(52) U.S. Cl. .................. 358/1.15; 358/1.12; 358/1.18; 358/1.9; 358/487; 355/40
(58) Field of Classification Search ................ 345/838; 358/1.15, 1.12, 1.18, 1.9, 487; 355/40
See application file for complete search history.

(56) References Cited

U.S. PATENT DOCUMENTS

| 4,760,606 | A | * | 7/1988 | Lesnick et al. ............. 382/306 |
| 5,359,387 | A | * | 10/1994 | Hicks ........................... 355/40 |
| 5,532,825 | A | | 7/1996 | Lim et al. .................... 358/474 |
| 5,666,215 | A | * | 9/1997 | Fredlund et al. ............ 358/487 |
| 5,767,988 | A | | 6/1998 | Dobbs et al. ................ 358/296 |
| 5,833,381 | A | | 11/1998 | Kellogg et al. ............... 355/40 |
| 5,852,503 | A | | 12/1998 | Kawaoka ...................... 382/48 |
| 5,940,168 | A | * | 8/1999 | Ishii ............................. 355/40 |
| 6,154,295 | A | * | 11/2000 | Fredlund et al. ............ 358/487 |
| 6,169,596 | B1 | * | 1/2001 | Shiota .......................... 355/40 |
| 6,264,384 | B1 | * | 7/2001 | Lee et al. .................... 400/322 |
| 6,322,260 | B1 | * | 11/2001 | Manico et al. .............. 396/599 |
| 6,456,391 | B1 | * | 9/2002 | Miyamoto et al. ......... 358/1.18 |
| 6,806,974 | B1 | * | 10/2004 | Ueda et al. ................. 358/1.13 |

FOREIGN PATENT DOCUMENTS

| EP | A-920184 | 6/1999 |
| EP | A-975147 | 1/2000 |
| EP | A-981246 | 2/2000 |
| JP | 05-045854 | 2/1993 |

* cited by examiner

*Primary Examiner*—Edward Coles
*Assistant Examiner*—Yixing Qin

(57) ABSTRACT

The invention relates to a method and apparatus for selection of pictures to print from a digital film, using a digital film enabled printer. The method comprises the steps of printing a selection sheet of thumbnail representations of photographs available on the digital film needed to be printed, the selection sheet further comprising a plurality of selection fields. According to a user choice of photograph to be printed, one or more of the selection fields associated with the thumbnails is marked and the marked selection sheet feed back into the printer. The printer includes a scanning mechanism which is arranged to read the marked up sheet and, in accordance with the user choice, print one or more photographs from the digital media in accordance with the marked selection fields.

24 Claims, 4 Drawing Sheets

METHOD AND APPARATUS FOR SELECTION OF ITEMS

The invention relates to a method and apparatus for selection of items. More particularly, specific embodiments of the invention relate to a method and apparatus for selecting pictures to print from a "digital film".

By digital film, it is meant storage media utilised by digital cameras, such media comprising Smart Media, Compact Flash or other types of solid-state storage card.

Currently, the selection of which pictures to print from such a digital film involves relatively awkward mechanisms to identify a sub-set of prints which the user desires. Typically, when deciding which photographs to print out from a digital camera, either some mechanism in the original camera has to be used (commonly involving the use of very small and fiddly buttons), whereas digital film enabled printers (i.e. printers having a dedicated interface for receiving digital films and enabling printouts) do enable stand alone printer configurations, but also tend to have rather clumsy user interfaces for individual selection of photographs, again using fiddly buttons.

Current solutions within the original camera rely on a DPOF (direct print order format) mechanism. For digital films made on cameras without such a facility, the standard approach is to print a "contact sheet" of all pictures on the film as a series of thumbnail pictures and then have the user select, on a limited front panel on the printer, the numbers (and number of copies, sizes etc.) of the prints required. Typically the user has to closely correlate print choices from the contact sheet with the state of a small display on the printer.

As can be appreciated, the reading off of numbers relating to pictures on a contact sheet and then inputting numbers and information relating to how to print out those choices, and in what number, is a tedious, non-intuitive process.

It is an aim of preferred embodiments of the present invention to provide a method and apparatus for easing the selection of items and their format for printing. More specifically, it is an aim of the present invention to ease the selection of prints from a digital film.

According to a first aspect of the present invention there is provided a method for selecting prints of photographs from a digital film media, the method comprising: (i) printing a selection sheet of thumbnail representations of photographs available on the media to be printed, the selection sheet further comprising a plurality of selection fields, each thumbnail representation being associated with at least one selection field; (ii) marking one or more of said selection fields according to a user choice of photograph(s) to be printed; (iii) inspecting the selection sheet to determine which of said selection fields has been marked in step (ii); and (iv) performing one or more actions relating to the photographs stored on said digital media, in accordance with said marked selection fields.

Preferably, for each thumbnail representation a corresponding plurality of selection fields are provided.

Preferably, step (iv) is a printing step and a first type of said corresponding plurality of selection fields designates a print format in which the photograph represented by said thumbnail representation is to be printed in step (iv).

Preferably, step (iv) is a printing step and a second type of said corresponding plurality of selection fields designates a number of prints of photographs corresponding to a particular thumbnail representation to be printed in step (iv). There may be provided n print number selection fields associated with each thumbnail representation, wherein the number of prints of a particular photograph determined to be printed corresponds to the total number of such n print number selection fields marked by the user.

A third type of said corresponding plurality of selection fields may be a "deletion" field which, when marked, designates that a particular photograph corresponding to the marked deletion field is to be deleted from the digital film media in step (iv).

Preferably, said selection sheet is also provided with an identifier which is unique to the digital film media and, wherein, in step (iii) said unique identifier is inspected in a preliminary step and, if the unique identifier does not correspond to a unique identifier allocated to the digital film media, then the method terminates.

The unique identifier may comprise a bar code.

Preferably, step (iv) is a printing step and in step (ii) a user fills in one or more of the selection fields according to user choice of photograph to be printed, user choice of number of prints of said photographs to be printed and user choice of format of said photograph to be printed.

Preferably, marking of said selection fields in step (ii) comprises filling in said selection field so as to change said selection field from a light, unselected, condition to a dark, selected, condition.

In said step (iii) the marked selection sheet may be scanned.

Preferably, in said step (iii) only those parts of the selection sheet corresponding to selection fields are inspected and the information gleaned from the inspection is processed to determine whether said selection fields are marked or unmarked.

The method may be implemented by means of a printer including a scanning mechanism in a feed path of the printer, wherein in step (i) the selection sheet is printed on the basis of data input directly to the printer by means of a digital film media interface, the printer being arranged to print out said selection sheet which is thereafter, in step (ii), manually marked by a user according to the user choice, the mark selection sheet then being input to the printer feed path and scanned by the scanning mechanism so as to perform the inspecting step (iii), data obtained during the inspecting step then being used so as to enable the printing in step (iv) of said one or more photographs.

According to another aspect of the invention, there is provided a digital film enabled printer, said printer including printing means, a first interface for interfacing with a digital film media and for reading data from said digital film media, a user interface for receiving commands from a user, inspection means located in a paper feed path of the printer, processing means for processing data from said digital film media and user commands from said user interface, the processing means being arranged to create and to print out, using the printing means, a selection sheet of thumbnail representations for photographs available on the media to be printed, wherein said selection sheet further comprises a plurality of selection fields, each of said thumbnail representation being associated with at least one of said selection fields, the processing means being further arranged for processing data from said inspection means so as to enable a user marked selection sheet input to the printer via the printer feed path to be inspected and a determination to be made as to which, if any, selection fields have been marked by the user and to enable the performance of one or more actions relating to the photographs stored on the digital film media in accordance with the marked selection fields.

Said actions preferably comprise the printing of one or more photographs from the media in accordance with the marked selection fields.

Said actions may include the deletion of one or more photographs from the media in accordance with marked "deletion" selection fields.

Said inspection means preferably comprises a scanning mechanism such as a scanner attached to a print head of the printing means and arranged for transverse movement with said print head across the feed path in response to signals from the processing means.

Said inspection means may alternatively comprise a plurality of photosensitive means disposed in the printer feed path in alignment with positions corresponding to said selection fields.

Preferably, for each thumbnail representation printed a corresponding plurality of selection fields are printed.

Preferably, a first of said corresponding plurality of selection fields designates an available print format in which the photograph represented by said thumbnail representation is capable of being printed.

Preferably, one or more of said corresponding selection fields designate available numbers of prints of photographs corresponding to a particular thumbnail representation.

There may be provided n print number selection fields associated with each thumbnail representation, wherein the number of prints of a particular photograph determined by the processing means to be printed corresponds to the total number of such n print number selection fields revealed by the inspection means as being marked by the user.

Preferably, said printer is also provided with a reader for reading from a marked selection sheet a unique sheet identifier which corresponds to a unique identifier of the digital film media and, the processing means being arranged so that if the unique sheet identifier does not correspond to the unique identifier of the digital film media, then the output of prints of photographs is disabled.

Said processing means may be further arranged to read a unique identifier from the digital film media via the first interface and to create and print out, using the printing means, a unique sheet identifier on said selection sheet.

Said unique sheet identifier may comprise a bar code and said reader comprise a bar code processing capability in the scanning mechanism. Alternatively said reader may comprise a dedicated bar code reader.

For a better understanding of the invention, and to show how embodiments of the same may be carried into effect, reference will now be made, by way of example, to the accompanying diagrammatic drawings in which.

As mentioned previously, the printing out of a contact sheet showing thumbnails of available photographs from the digital film and then using a keyboard on the printer to input print selections is a very counter intuitive means (and therefore time consuming) of making selections of individual photographs for printout.

Figure 1:
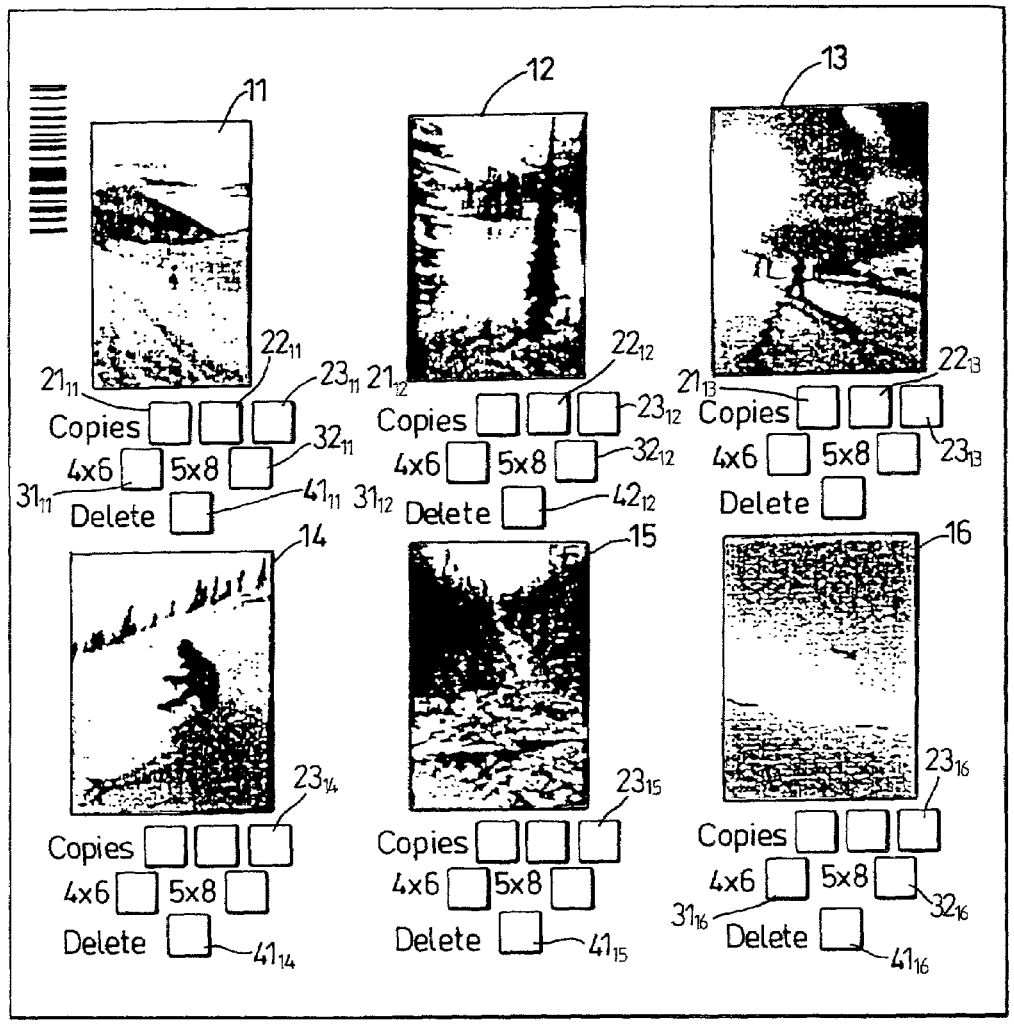
FIG. 1 shows an example of a selection sheet printable by a digital film enabled printer in accordance with an embodiment of the present invention.

Embodiments of the present invention, rather than printing out a contact sheet from a digital film enabled printer, instead provide for the printing out of a selection sheet 10. An embodiment of such a selection sheet 10 is shown in FIG. 1. From FIG. 1, it will be appreciated that thumbnail photographs 11 to 16 (similar to those printed out in the prior art) are provided, but each of those thumbnail representations is also provided with a plurality of user markable selection fields. For instance, underneath thumbnail 11, there are shown a first type of selection field comprising boxes $21_{11}$–$23_{11}$. relating to a number of copies of that print which it might be desired to obtain, a second type of selection field comprising selection boxes $31_{11}$, $32_{11}$ relating to alternative print sizes (formats) and a third type of selection field comprising selection box $41_{11}$ relating to whether or not to delete a particular photograph from the digital film media. The selection sheet is also provided with a unique sheet identifier comprising a bar code 40 corresponding to a unique identifier of the particular digital film.

Referring now to the flow chart of FIG. 3, it will be explained how the selection sheet of FIG. 1 may be utilised to enable the printout of selected prints, selected numbers of such prints and selected formats of the prints in a user friendly fashion.

Figure 3:
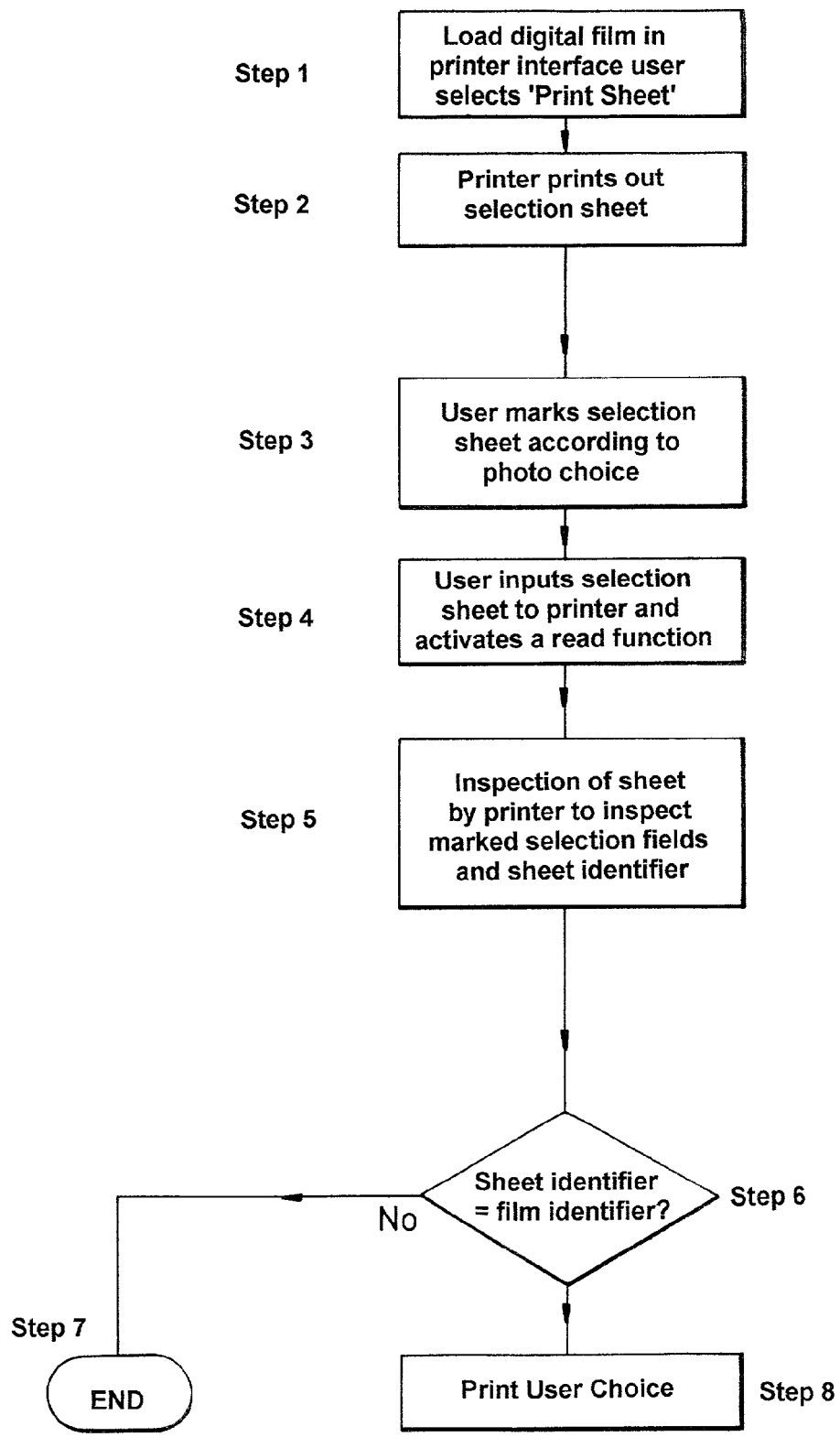
FIG. 3 is a flow diagram illustrating user selection steps involved in selecting numbers and formats of prints.

In step 1 of FIG. 3, a user loads a digital film media to a printer and selects a "print sheet" function. Typically, this may involve the insertion of a smart card bearing the photographic images into an appropriate input port on a stand-alone digital film enabled printer and entering a simple command via a user interface. Alternatively, this step may comprise the sub-steps of reading the digital film into, for instance, a PC port or other input facility.

In step 2 of FIG. 3, the printer (be it the stand-alone printer or a printer connected to an appropriate output port of a PC) is arranged to print out a selection sheet of the type shown in FIG. 1, the selection sheet including thumbnail representations of the various selectable prints and further including the selection fields and bar code described in relation to FIG. 1.

In step 3, a user takes the printed out selection sheet and fills in the selection fields according to that user's choice. For instance, referring to FIG. 2, it can be seen that for thumbnail 12, the user has selected one copy in 4×6 format, for thumbnail 13 the user has selected two copies in 5×8 format, for thumbnail 14 the user has selected two copies in 4×6 format and for thumbnail 15 the user has selected one copy in 5×8 format. The user has made no selections of thumbnails 11 or 16. The selection fields are provided with appropriate intuitive alphanumeric identifiers (i.e. in this case "copies", "4×6" and "5×8") so that the operation is particularly simplified.

In step 4, the user then inputs the marked-up selection sheet to the input feed of the printer and via a user interface sets the printer to read the marked sheet. In step 5, an inspection mechanism provided in the printer inspects (for instance scans) the marked selection sheet, including all of the information relating to copies, format and the bar code information relating to the digital film itself. In step 6, a comparison is made between the unique sheet identifier (bar code) on the marked selection sheet and the unique identifier of the digital film which is currently loaded to ensure that they correspond. If there is no correspondence, then further operations are aborted in step 7. However, if there is correspondence between bar code and the loaded digital film then the information from the marked selection sheet is regarded as valid, the marked selection sheet is returned to the user and the printer then automatically proceeds to process and interpret the scanned data and to print out the appropriate number of copies of user selected prints in the appropriate formats in step 8.

If the scanned data shows that one or more of the "deletion" boxes $41_{11}$ etc. have been marked then the processing means of the printer is instructed to delete the corresponding photographs from the digital film media.

If the user retains the marked selection sheet then the user may, in the future, use that selection sheet again by reloading the digital film into its interface and directly selecting read to scan the marked sheet. In such a case this shortened procedure would start at step 4 above.

It will be readily appreciated that because the method provides a way in which information related to selected photographs are to be handled, that information need not necessarily be confined to formats and numbers of prints of photographs to be output. For instance, they could also be provided a selection field which, when marked, authorises deletion of a particular photograph from the digital film media. In this way, the information on the sheet may also be used if desired to actually control what is stored on the digital film media and how that is stored.

Figure 2:
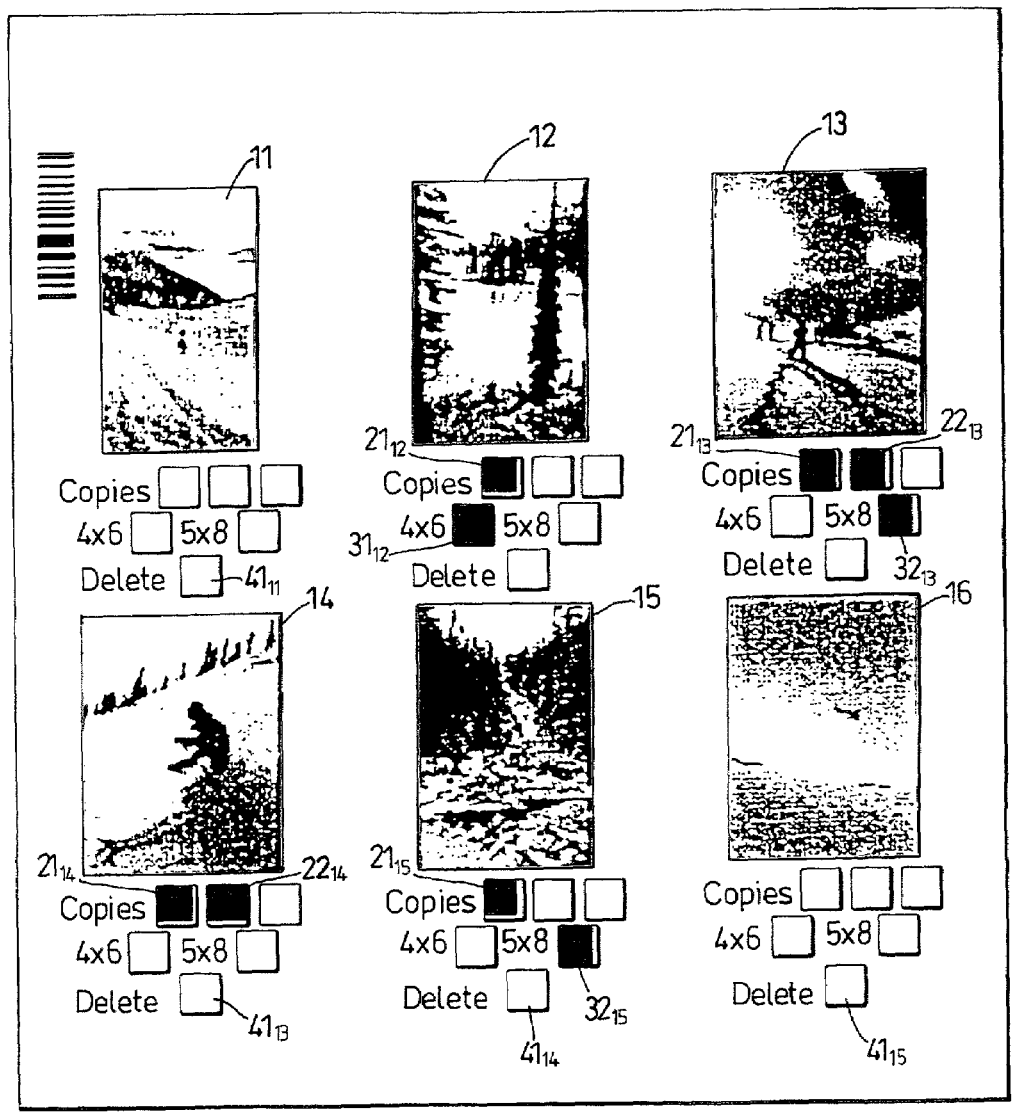
FIG. 2 shows the selection sheet of FIG. 1, on which user selections of print numbers and formats have been made.

As will be appreciated from the above discussion in relation to FIGS. 1 to 3, embodiments of the invention require that the digital film enabled printer include some means for reading off information from the marked selection sheet.

Figure 4:
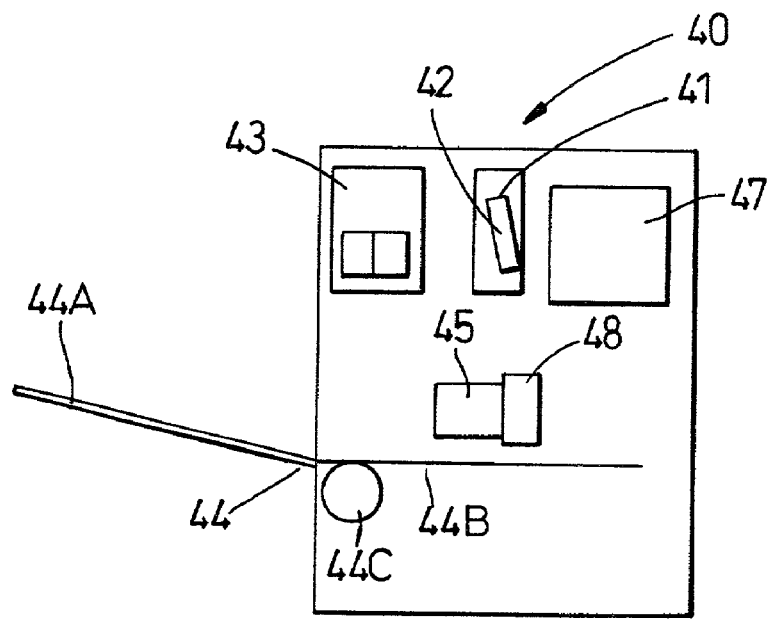
FIG. 4 shows an example in schematic block form of a printer according to the preferred embodiment of invention.

Referring now to FIG. 4, there is shown a schematic representation of a digital film enabled printer 40. The printer has a first interface 41 for interfacing with a digital film media 42 and for reading data from the digital film media 42, a user interface 43 for receiving commands from a user, an input/output printer feed path 44 comprising an input tray 44A and path 44B with feed roller 44C, processing means 47, print means comprising a print head 48, and inspection means comprising a scanning mechanism 45 arranged for transverse movement across the feed path 44 and being located on the print head 48 for providing the transverse movement.

It will be appreciated that in the digital film enabled printer 40, a user may initiate the printing out of a selection sheet 10 from data of the digital film media 42 from the first interface 41 as a routine operation via the user interface 43. The selection sheet has a known format imposed upon it by the processing means 47 and the printing means. Therefore, when the marked selection sheet is fed back into the printer using the printer feed path 44, the print head 48 is caused to move back and forth across the feed path and the marked selection sheet is scanned by the scanning mechanism 45, it is a simple and routine matter to provide appropriate software which will enable the processing means 47 to automatically "know" what parts of the data from the scanning mechanism 45 will carry valid data (i.e. correspond to the expected position of a selection field or the bar code) and therefore which particular positions on the selection sheet require inspection. This foreknowledge of expected valid data positions is available because the speed of the print feed for the given printer is known and, therefore, the time at which the individual selection fields bearing the relevant information will pass beneath the scanning mechanism on the print head 48 is predictable.

Because the inspection operation which needs to be carried out to check whether particular selection fields have been filled in is relatively simple, the scanning mechanism need not be particularly sophisticated (and therefore may be of low cost).

In a less preferred alternative to providing a scanning mechanism 45 associated with the print head 48 a static scanning bar could be provided suspended across the feed bath. A dedicated bar code reader could be provided for reading the bar code of the sheet.

Figure 5:
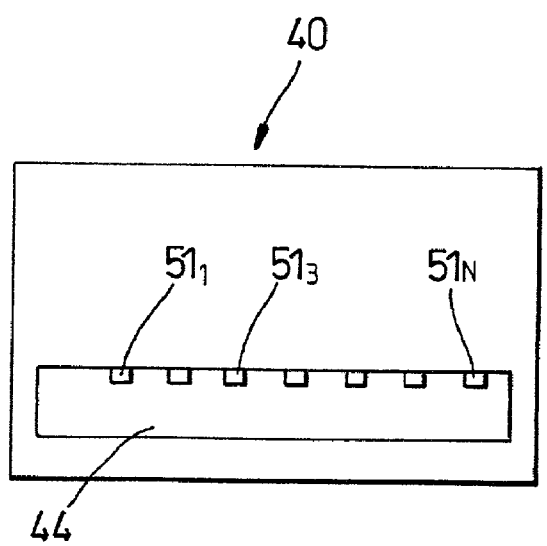
FIG. 5 is a view along the printer feed path of a printer similar to the FIG. 4 embodiment but incorporating a low-cost inspection means.

As a further alternative to incorporating a scanner in the feed path of the printer, a less sophisticated mechanism for inspection, as shown in FIG. 5 may be employed. FIG. 5 is an end-on view showing the entry slot of a printer feed path (feed tray removed for clarity). In the FIG. 5 embodiment photodiodes $51_1$–$51_N$ (or similar light sensitive means) are positioned across the feed path 44 at positions corresponding to the various selection fields and outputs from such photodiodes $51_1$–$51_N$ are read only during valid periods as in the discussion above. In other words, a valid period is set to be a period in which a filled/unfilled selection field is expected to pass in front of a given photodiode and in which the output of a simple light or dark signal from that photodiode will therefore convey meaningful information. In such a dedicated printer, the other elements as discussed in relation to FIG. 4 above (with the exception of the scanning mechanism 45) are also provided and there may further be provided a dedicated bar code reader for reading the sheet identifier.

It will also be appreciated that, in a less preferred embodiment, the inventive selection process may also be employed using a conventional PC, scanner and printer, with appropriate scanning software being provided to operate the scanner and analyse the scanned results in the PC.

It is noted that combined printers with scanners are known, for instance, from U.S. Pat. No. 5,767,988, U.S. Pat. No. 5,532,825 and U.S. Pat. No. 5,833,381 all of which are assigned to Hewlett-Packard Company.

From the aforementioned description, it will be appreciated that embodiments of the present invention provide a user-friendly means by which prints from a digital film media may be selected for output in appropriate numbers and formats.

Many variations may be made to the apparatus and methods of the present invention whilst still remaining within the scope of the invention. The scope of the invention is limited only by the scope of the appended claims.

What is claimed is:

1. A method of selecting prints of photographs from a digital film medium, the method comprising:
   (i) printing a selection sheet of thumbnail representations of photographs available on the medium to be printed, the selection sheet further comprising a plurality of selection fields,
   (ii) marking one or more of said selection fields according to a user choice of photographs to be printed;
   (iii) inspecting the selection sheet to determine which of said selection fields has been marked in step (ii); and
   (iv) performing one or more actions relating to the photographs stored on said digital medium, in accordance with said one or more marked selection fields,
   wherein, for each thumbnail representation, a corresponding plurality of selection fields are provided, one type of said corresponding plurality of selection fields being a "deletion" field which, when marked, designates that a particular photograph corresponding to the marked deletion field is to be deleted from the film medium in step (iv).

2. A method according to claim 1, wherein step (iv) includes a printing step, and one type of said corresponding plurality of selection fields designates a print format in which the photograph represented by said thumbnail representation is to be printed in step (iv).

3. A method according to claim 1, wherein step (iv) includes a printing step, and one type of said corresponding plurality of selection fields designates a number of prints of photographs corresponding to a particular thumbnail representation to be printed in step (iv).

4. A method according to claim 1, wherein said selection sheet is also provided with an identifier which is unique to the digital film medium and wherein, in step (iii), said unique identifier is inspected in a preliminary step and, if the unique identifier does not correspond to a unique identifier allocated to the digital film medium, then the method terminates.

5. A method according to claim 4, wherein said unique identifier comprises a bar code.

6. A method according to claim 1, wherein step (iv) is a printing step, and in step (ii), a user fills in one or more of the selection fields according to user choice of photograph to be printed, user choice of number of prints of said photographs to be printed and user choice of format of said photograph to be printed.

7. A method according to claim 1, wherein marking of said selection fields in step (ii) comprises filling in said selection field so as to change said selection field from a light, unselected condition to a dark, selected condition.

8. A method according to claim 1, wherein in said step (iii), the marked selection sheet is scanned.

9. A method according to claim 1, wherein in said step (iii), only those parts of the selection sheet corresponding to selection fields are inspected, and the information gleaned from the inspection is processed to determine whether said selection fields are marked or unmarked.

10. A method according to claim 1, the method being performed by a printer including a scanning mechanism in a feed path of the printer, wherein in step (i), the selection sheet is printed on the basis of data input directly to the printer by a digital film media interface, activating the printer to print out said selection sheet which is thereafter, in step (ii), manually marked by a user according to the user choice, the mark selection sheet then being input to the printer feed path and scanned by the scanning mechanism so as to perform the inspecting step (iii), data obtained during the inspecting step then being used to perform the printing in step (iv) of said one or more photographs.

11. A digital film enabled printer, said printer including a print head, a first interface for reading data from a digital film medium, a user interface for receiving commands from a user, a detector located in a sheet feed path of the printer, a processor for processing data from said digital film medium and user commands from said user interface, the processor being arranged to create and to print out, using the print head, a selection sheet of thumbnail representations of photographs available on the medium to be printed, said selection sheet comprising a plurality of selection fields, each of said thumbnail representations being associated with at least one of said plurality of selection fields, the processor being arranged for processing data from said detector so as to enable a user-marked selection sheet input to the printer via the printer feed path to be inspected and a determination to be made as to which, if any, selection fields have been marked by the user and to enable the performance of one or more actions relating to the photographs stored on the digital film medium in accordance with the marked selection fields, wherein, for each thumbnail representation printed, the plurality of selection fields are printed, one type of said plurality of selection fields, when marked, designating that the photograph corresponding to the thumbnail representation is to be deleted from the digital film media, the processor being arranged to respond to the marking indicating deletion by deleting from the digital film medium the image associated with the deleted marking.

12. A printer according to claim 11, wherein said detector comprises a scanning mechanism associated with the print head of the printing means.

13. A printer according to claim 12, wherein said scanning mechanism is attached to the print head and is movable transversely across the feed path in response to signals from the processor.

14. A printer according to claim 11, wherein one type of said plurality of selection fields designates, when marked, the print format in which the photograph represented by said thumbnail representation is to be printed.

15. A printer according to claim 11, wherein one type of said selection fields designates, when marked, the number of prints of photographs corresponding to a particular thumbnail representation to be printed.

16. A printer according to claim 11, wherein said processor is further arranged to read a unique identifier from the digital film medium via the first interface and to create and print out, using the print head, a unique sheet identifier on said selection sheet.

17. A printer according to claim 16, wherein said detector is further arranged for reading the unique sheet identifier, and the processor is arranged so that if the unique sheet identifier does not correspond to the unique identifier of the digital film media, then the performance of said one or more actions is inhibited.

18. A printer according to claim 16, wherein said unique sheet identifier comprises a bar code.

19. A method of printing images carried by a digital film medium by using an apparatus including (a) a reader of the images on the digital film medium, (b) a printer for forming (i) thumbnail photographs of the images read by the reader and (ii) a selection field including a delete selection associated with each of the photographs, and (c) a detector for markings on the selection fields, the method comprising:
  inserting the digital film medium into the reader;
  causing the reader to read the images on the digital film;
  applying a sheet to the printer;
  transferring the images read by the reader to the printer and thence to the sheet applied to the printer so thumbnail photographs of the transferred images are printed by the printer on the sheet;
  causing the printer to apply to the sheet a selection field for each of the thumbnail photographs on the sheet;
  marking the selection field associated with at least one of the thumbnail photographs;
  reinserting the sheet with the thumbnail photographs and the marked selection field into the apparatus;
  reading the marked selection field with the detector;
  subsequently printing the at least one of the thumbnail photographs in accordance with the markings therefor;
  marking the delete selection for one of the thumbnail photographs;
  reading the delete selection with the detector while the sheet with the marked delete selection is reinserted in the apparatus; and
  responding to the read delete selection marking by removing from the digital film the image associated with the delete selection marking.

20. A method according to claim 19, wherein the images are transferred to the sheet by causing the sheet to move relative to the printer via a predetermined path and further including the step of causing the sheet, when reinserted into the apparatus, to move relative to the detector via the same predetermined path.

21. Apparatus comprising the reader, printer and detector set forth in the preamble of claim 19 in combination with a processor for performing the transferring, reading and both causing steps of claim 19.

22. A method of deleting an image carried by a digital film medium by using a sheet including thumbnail photographs of images on the digital film medium and a selection field associated with each of the thumbnail photographs, the selection fields including a delete entry the method comprising:

marking the delete entry for the image to be deleted from the digital film medium;

inserting the sheet with the thumbnail photographs and the marked delete entry into an apparatus including a detector for the markings on the selection fields;

reading the marked delete entry with the detector; and removing from the digital film medium the image associated with the marked delete entry by responding to the marked delete entry read by the detector.

23. Apparatus comprising the detector of claim 22 in combination with a processor for performing the removing step of claim 22.

24. A sheet for controlling deletion of images carried by a digital film medium, the sheet being adapted for use with an apparatus including a detector for markings on the sheet and a processor for controlling removal of the image from the digital film medium, the sheet comprising:

plural thumbnail photographs of images carried by the digital film medium, each of said thumbnail photographs being associated with a selection field, the selection field including a delete entry, the delete entry being positioned and arranged on the sheet so that in response to the delete entry being marked, the detector causes the processor to remove the image associated with the marked delete entry from the digital film medium.

* * * * *